United States Patent [19]

Eubanks

[11] Patent Number: 4,894,948
[45] Date of Patent: Jan. 23, 1990

[54] HAND HELD APPARATUS FOR SELECTIVE APPLICATION OF LIQUID HERBICIDE

[75] Inventor: Tommy A. Eubanks, Glenmora, La.

[73] Assignee: Sefco, Inc., Lafayette, La.

[21] Appl. No.: 276,949

[22] Filed: Nov. 28, 1988

[51] Int. Cl.$^4$ ............................................. A01M 21/00
[52] U.S. Cl. ....................................... 47/1.5; 401/196; 401/207
[58] Field of Search ................................ 401/196–198, 401/202, 205, 207; 47/1.5, 1.7; 138/DIG. 8; 239/145

[56] References Cited

U.S. PATENT DOCUMENTS

| | | | |
|---|---|---|---|
| 4,276,718 | 7/1981 | Keeton et al. | 47/1.5 |
| 4,409,755 | 10/1983 | Maddock | 47/1.5 |
| 4,426,807 | 1/1984 | Maddock | 47/1.7 X |
| 4,553,350 | 11/1985 | Hardy et al. | 47/1.5 |
| 4,597,219 | 7/1986 | Kropf | 47/1.5 |
| 4,615,642 | 10/1986 | Mason | 239/145 X |
| 4,616,055 | 10/1986 | Mason | 239/145 X |
| 4,727,678 | 3/1988 | Struve et al. | 47/1.5 |

Primary Examiner—Richard J. Apley
Assistant Examiner—David J. Bender
Attorney, Agent, or Firm—Joseph L. Lemoine, Jr.

[57] ABSTRACT

A hand-held liquid applicator for wipingly applying liquid herbicide to undesired vegetation. The applicator includes an elongated tubular handle and a removable wiper head. The tubular handle serves as a reservoir for containing liquid herbicide and as a conduit for supplying the herbicide to the applicator head. The applicator head is made of porous, bonded crumb-rubber irrigation piping, sealed at one end. Internally disposed inside the applicator head is a bendable wire stiffener which allows the applicator head to be conformed to a desired shape.

8 Claims, 1 Drawing Sheet

U.S. Patent Jan. 23, 1990 4,894,948
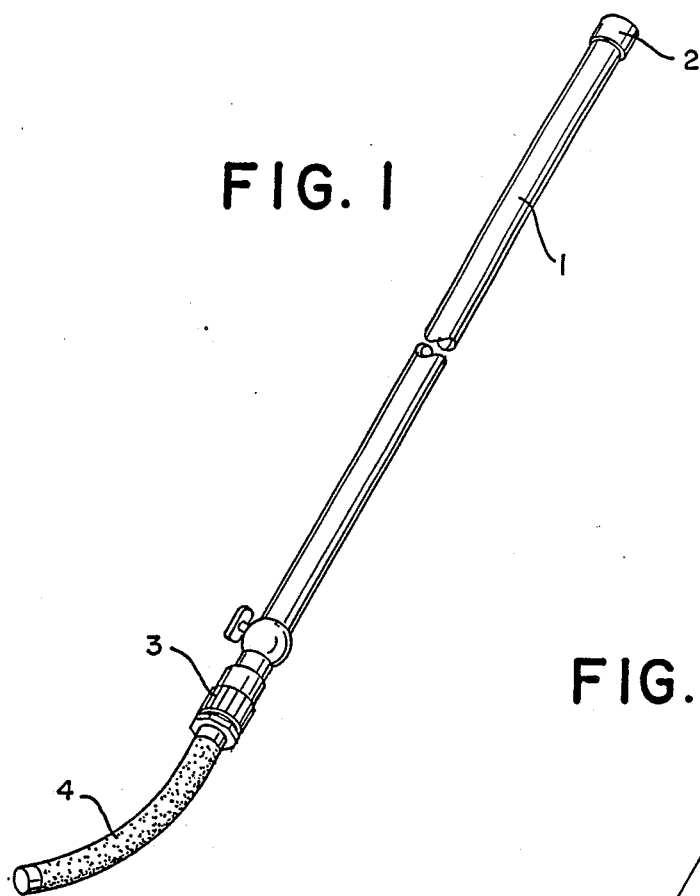
FIG. 1
FIG. 2
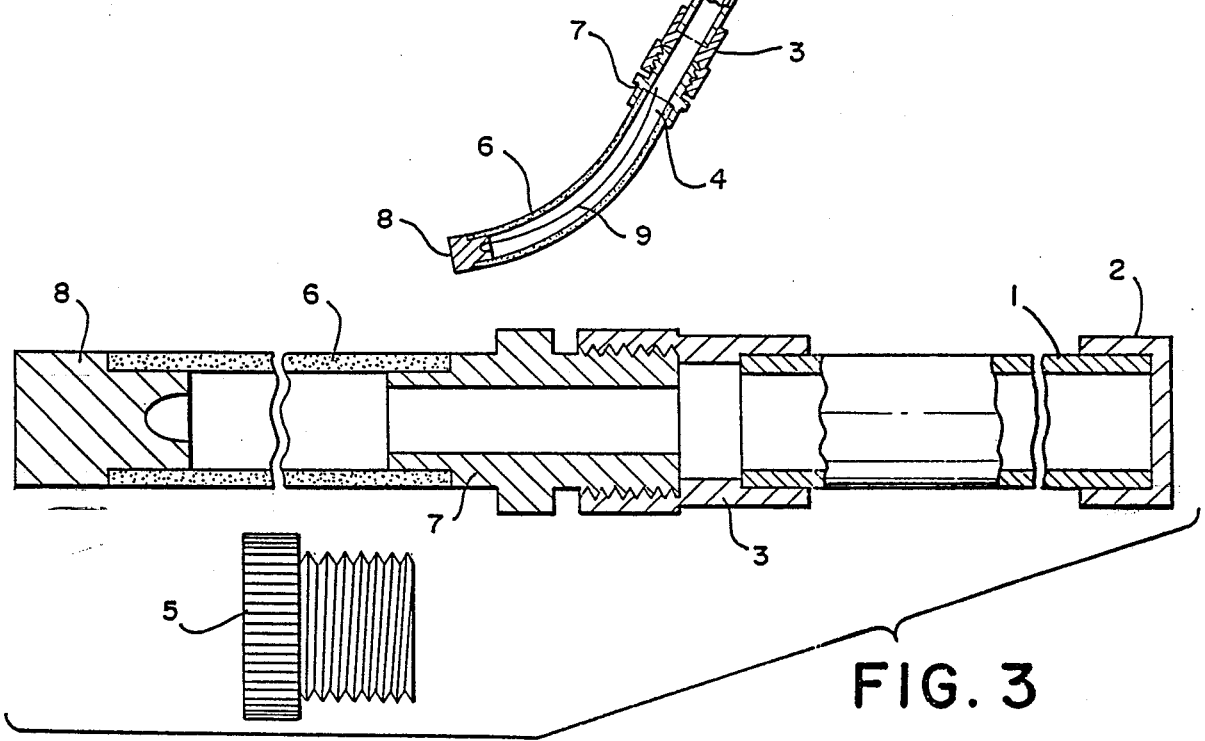
FIG. 3

HAND HELD APPARATUS FOR SELECTIVE APPLICATION OF LIQUID HERBICIDE

BACKGROUND OF THE INVENTION

1. Field of the Invention

The invention relates to hand-held apparatus for wipingly applying liquid herbicide to undesired vegetation.

2. Prescription of Prior Art

Several devices have been devised for wipingly applying liquid herbicide to undesired vegetation. Since liquid herbicides tend to be expensive, tend to kill most forms of vegetation they contact and can cause environmental damage if applied excessively, it is highly desirable that applicators dispense only the minimum effective amount of herbicide, at the location desired without significant spillage or wastage. It is further desirable that the wiping element be durable to abrasion, and easily inexpensively replaceable when worn-out. As with any mechanical apparatus, it is further desirable that, consistent with efficient function, such applicator be designed with a minimum number of parts which would increase initial fabrication costs or maintenance of the applicator. Prior art devices have been only partially successful at achieving the above goals. As will be seen prior art designs relied on use of relatively large "wicking elements", which had to become saturated with a relatively large amount of herbicide before the element would efficiently transfer herbicide to vegetation. When use of the applicator was finished, a large amount of herbicide remained in the element, to evaporate and be wasted. Additionally, prior art wicking elements were excessively permeable and tended to leak or apply excess herbicide unless a means for controlling excess herbicide flow was provided. Various means previously used to control flow were air valves, liquid valves or restricting orifices, which increased initial costs, and maintenance, yet were imprecise in regulating flow and had to be constantly monitored.

Laughlin, U.S. Pat. No. 3,002,319 discloses a combination weed cutter/abrader to which a herbicide applicator was attached. The applicator consisted of a chemically impregnated pad which may be fed from the reservoir.

Patrick, U.S. Pat. No. 4,017,986 discloses a hand-held applicator for dabbingly applying liquid herbicide to woody vegetation. The applicator head consisted of several layers of sponge type material covered with a durable rug type covering. On each use of the applicator after being stored, the sponge material and covering had to be saturated with herbicide before it would "wick" effectively. At the end of use the amount of herbicide saturating the sponge and cover would be retained by those elements, and be wasted, by evaporation during storage. Because of excessive permeability of the applicator head, the applicator was provided with a orifice plate and a means for controlling vacuum in the reservoir.

Keeton, U.S. Pat. No. 4,276,718 discloses a hand-held applicator comprising two containers, a metering valve and a roller having a fibrous covering. On initial use the fibrous roller absorbed a large amount of herbicide before it would function effectively. On application of herbicide the roller would become too dry and have to be inserted, and rotated, in one of the containers for rewetting with herbicide. The metering valve somewhat restricted the roller from becoming excessively wet, if used properly.

Maddock, U.S. Pat. No. 4,291,491 discloses a hand-held applicator comprising a reservoir, a handle-conduit and a wicking head. The wicking head comprised a sponge type wick attached to a rigid dispensing tube. On initial use after storage, the wicking element had to be saturated with herbicide before it would work properly, which amount of the herbicide would be wasted, by evaporation, on restorage. Because of excess permeability of the sponge the handle was provided with a metering valve. The sponge type material was not durable to abrasion and its width made the applicator not well suited for application of a very narrow strips of herbicide, such as is desired when edging sidewalks or driveways.

Maddock, U.S. Pat. No. 4,357,779, discloses a hand-held herbicide applicator somewhat improved by addition of an outer skin to retard outer wetting the wiping head sufficiently to promote even saturation of the sponges interior. The sponge still requires a substantial, wasted quantity of herbicide to accomplish saturation of the sponge. Flow control is still provided in an attempt to solve the problem of excess permeability of the saturated sponge.

Maddock, U.S. Pat. No. 4,305,224 discloses a hand-held herbicide applicator comprising a reservoir, tubular handle-conduit, metering means and one or more elongated wicking elements. The wicking element absorbed herbicide until, by wicking action, became saturated, then a user could apply herbicide to vegetation. Because of excess permeability of the wicking element flow control means, consisting of an air valve and a liquid valve, were provided.

Keeton, U.S. Pat. No. 4,403,881 discloses a hand-held herbicide applicator comprising a handle-reservoir and a sponge-type applicator held in a slitted, rigid tube. The applicator head is not bendably conformable to different shapes and use of sponge-type material resulted in use of significant quantities of herbicide for wetting of the sponge. Flow control means is provided in attempt to solve the problem of excess permeability of the applicator head.

Kroph, U.S. Pat. No. 4,597,219 discloses a hand-held herbicide applicator comprising a handle-reservoir and a head composed two wicking means, the outer wicking material being non-woven fibrous chamois material. The head is not bendable conformable to various shapes. To control excess flow a small hole or orifice is provided between the reservoir and the first wicking means.

Struve, U.S. Pat. No. 4,727,678 discloses a hand-held applicator comprising a tubular handle-reservoir and fibrous paint roller which is partially exposed through a window in an impermeable shield. The paint roller, on initial use after storage, must become saturated with herbicide to function properly, which said saturation quantity is wasted on re-storage. When the roller became over-saturated the user is supposed to be invert the applicator to allow some herbicide to drain back into the handle.

Also appearing in prior art are devices which were not designed or used for wipingly applying herbicide to vegetation, but rather were designed for underground irrigation.

Mason, U.S. Pat. No. 4,517,316 discloses uniformly porous irrigation piping designed for underground burial. The piping is made of screened crumb rubber, of uniform water content, combined with a termoplastic binder resin. By controlling the temperature and rate of extrusion, the water vaporizes during extrusion and the expanding bubbles of steam in the binder resin form a network of pores which allows the pipe to leak, or weep, uniformly.

Mason, U.S. Pat. No. 4,616,055 discloses similar porous irrigation piping with improved pore consistency and strength.

OBJECTS OF THE INVENTION

The general objects of the present invention is to provide an improved applicator for wipingly applying herbicide to undesired vegetation.

More particularly, one object of the present invention is to provide very thin applicator head so that the applicator may be conveniently used to "edge" around sidewalks, driveways and other fixed structures, without killing an undesirably broad swath of vegetation.

Another object of the present invention is to provide an applicator head that is relatively durable to repeated wiping contact with vegetation, and which is easily, and inexpensively replaceable when worn out.

A further object of the invention is to provide a wiping head that is bendably conformable to a desired shape, so as to allow for spot application when desired, thin line application when desired, or broad swath application when desired.

Yet another object of the invention is to provide an applicator which is self regulating and does not require constant monitoring by the user to assure proper herbicide flow.

Still another object of the invention is to provide a non-absorbent wiping material which does not require saturation by significant amounts of herbicide each time the applicator is used.

A still further object of the present invention is to eliminate expensive, and troublesome, flow control means such as air metering valves, liquid metering valves and orifice passages.

The present invention accomplishes all of the above objects. It is inexpensive, durable and trouble free, economical to use, does not require monitoring and is suited for a variety of uses, from killing a single unwanted weed, to edging around solid objects or defoliating fairly wide swaths of ground.

SUMMARY OF THE INVENTION

The improved hand-held apparatus for wipingly applying liquid herbicide to unwanted vegetation is characterized by a tubular handle which serves as a reservoir for liquid herbicide and as a conduit for conducting herbicide to a wiper head below. The reservoir-handle is sealed at its upper end to create a partial vacuum which prevents excess flow through the wiper head.

A wiper head is threadably adapted to the lower end of the reservoir-handle, to allow for filling of the reservoir, removal during storage, and replacement of worn wiper heads.

The wiper head is made of flexible, porous irrigation tubing sealed at its lower end. A porosity of approximately 0.01 to 0.03 gallon per minute/linear foot of pipe, at 10 p.s.i. is best for herbicide mixtures consisting largely of water. A bendable wire stiffener is internally disposed in the wiper head to allow the head to be conformed to a desired shape.

BRIEF DESCRIPTION OF THE DRAWINGS

FIG. 1 is a perspective view of the liquid herbicide applicator of the present invention.

FIG. 2 is a vertical section view of the liquid herbicide applicator of the present invention.

FIG. 3 is a larger vertical section view of the wiper head of the present invention.

DESCRIPTION OF THE PREFERRED EMBODIMENTS

Referring more particularly to the drawings FIG. 1 illustrates the liquid herbicide of the present invention in proper configuration for usage.

With reference to FIG. 2 and FIG. 3, the applicator includes an elongated tubular handle 1, which is sealed at its upper end by cap 2. A thread-to-tubing adaptor 3 is attached to the lower end of the elongated tubular handle 1, to allow attachment of either a wiper head 4, or a sealing plug 5, to the handle.

Wiper head 4 is made of a desired length of porous, rubber irrigation tubing 6, such as that disclosed in Mason, U.S. Pat. No. 4,616,055.

The upper end of the porous irrigation tubing is gluingly attached to a suitable thread-to-tubing adaptor 7. The threads of the wiper head adaptor 7 correspond and mate with those on the lower part of the tubular handle adaptor 3.

The lower end of the wiper head 4 is sealed by plug 8, gluingly attached to the porous tubing 6.

A bendable, but fairly stiff wire 9, is internally disposed in the wiper head 4, to give the head rigidity while in use, yet allow it to be bendably conformed to a desired shape.

The tubular handle 1 is preferably assembled using standard $\frac{1}{2}''$ or $\frac{3}{4}''$ schedule 40, p.v.c. pipe, but a variety of other materials and grades may also be used.

The wiper head 4 is preferably assembled using standard $\frac{1}{2}''$ or $\frac{3}{4}''$ flexible irrigation piping (often called "soaker hose") to which a standard p.v.c. plug and p.v.c. thread-to-tubing adaptor is glued. Flexible irrigation piping is supplied in varying porosities. A porosity of approximately 0.03 gallon per minute leakage, per linear foot of pipe, at 10 p.s.i. had been found to be optimum for application of herbicide which is near the viscosity of water. Other grades of porous piping may be used for fluids of different viscosity, or to achieve a lesser or greater application rate. Too porous a tubing will cause the wiper head to drip excessively. Insufficient porosity will cause inadequate application. Proper porosity is characterized when the outer surface of the wiper head is completely wetted by liquid herbicide when the applicator is held upright, but the wiper head does not drip.

The stiffener is preferably made using number 9 galvanized steel wire, but a wide variety of fairly rigid, but bendable materials could be used.

The improved applicator is simple and easy to use. To fill the handle, the handle is inverted and wiper head is removed. After the handle is filled, the wiper is reattached and the applicator turned upright (handle up, wiper head down). Herbicide then flows into the wiper head and a partial vacuum is created in the handle which opposes free flow of liquid through the wiper head pores. Surface tension of the liquid on the outer surface of the wiper head further resists free flow of liquid through the pores.

Herbicide is applied to undesired vegetation by simply wiping the head across same. If a broad area of vegetation is to be killed the applicator is moved side to side. If narrow "edging" is desired the wiper is dragged along the ground along the axis of the wiper head. If a singular spot application is desired the head can be bent into a U-shape to provide a minimal contract area.

When application of herbicide is complete the applicator is inverted. Virtually all of the herbicide, except a minimal amount trapped in the pores, returns to the tubular handle, from whence it can be returned to an original container or left in the handle. If long term storage in the handle is contemplated, the wiper head can be removed and a sealing plug, or cap, screwed into the handle to prevent evaporation. Alternatively, a valve can be fitted to the lower part of the handle, to prevent evaporation during storage.

Although the rubber wiper head is quite durable, wear can be expected with substantial use. A worn wiper head can be replaced by simply unscrewing and discarding the old one and replacing it with a new head.

Wiper heads of differing porosities can be provided, to allow the use of one applicator with differing liquids.

What is claimed is:

1. A hand-held apparatus for wipingly applying liquid herbicide to unwanted vegetation comprising:
   (a) an elongated tubular handle-reservoir for containing a quantity liquid herbicide and conducting same to a wiper head, said handle comprising a desired length of tubing impervious to liquid herbicide, a cap or plug sealingly affixed to the upper end of said tubing and threadable means at the lower end of said tubing, for screwingly attaching a wiper head to said handle-reservoir; and,
   (b) a tubular wiper head containing a quantity of liquid herbicide and for conducting same to the outer surface of the wiper, said wiper head comprising porous rubber irrigation piping of a porosity which leaks water from 0.01 g.p.m. per linear foot to 0.03 g.p.m. per linear foot at a pressure of 10 psi, a cap or plug sealingly attached to the lower end of said irrigation piping, threadable means attached to the upper end of said irrigation piping which mates with the threadable means on the lower end of the handle-reservoir, and, bendably shapable stiffener internally disposed in said irrigation piping.

2. The apparatus of claim 1 wherein the elongated tubular handle is commercial grade ½" schedule to 40 p.v.c. piping.

3. The apparatus of claim 1 wherein the elongated tubular handle is commercial grade ¾" schedule to 40 p.v.c. piping.

4. The apparatus of claim 1 wherein the porous rubber irrigation piping is commercial grade ½" soaker hose.

5. The apparatus of claim 1 wherein the porous rubber irrigation piping is commercial grade ¾" soaker hose.

6. The apparatus of claim 1 wherein the bendably shapable stiffener is a section of commercial grade number 9 galvanized steel wire.

7. The apparatus of claim 1, further comprising:
   (c) a threaded cap or plug which sealingly mates with the threadable means at the lower end of the handle-reservoir, for preventing evaporation of liquid from said handle-reservoir during non-use.

8. The apparatus of claim 1, further comprising:
   (c) an airtight valve disposed at the lower end of the handle-reservoir, for preventing evaporation of liquid from said handle-reservoir during non-use.

* * * * *